US010748118B2

(12) United States Patent
Fang

(10) Patent No.: US 10,748,118 B2
(45) Date of Patent: *Aug. 18, 2020

(54) SYSTEMS AND METHODS TO DEVELOP TRAINING SET OF DATA BASED ON RESUME CORPUS

(71) Applicant: Facebook, Inc., Menlo Park, CA (US)

(72) Inventor: Miaoqing Fang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 15/091,077

(22) Filed: Apr. 5, 2016

(65) Prior Publication Data

US 2017/0286914 A1 Oct. 5, 2017

(51) Int. Cl.
| | |
|---|---|
| *G06Q 10/10* | (2012.01) |
| *G06Q 10/00* | (2012.01) |
| *G06Q 10/08* | (2012.01) |
| *G06Q 30/02* | (2012.01) |
| *G06Q 30/08* | (2012.01) |
| *G06N 5/04* | (2006.01) |
| *G06N 20/00* | (2019.01) |

(52) U.S. Cl.
CPC .......... *G06Q 10/1053* (2013.01); *G06N 5/04* (2013.01); *G06N 20/00* (2019.01); *G06Q 10/105* (2013.01)

(58) Field of Classification Search
CPC .... G06Q 10/105; G06Q 10/1053; G06N 5/04; G06N 20/00
USPC .................................. 705/1.1–912, 320, 321
See application file for complete search history.

(56) References Cited

U.S. PATENT DOCUMENTS

| | | | |
|---|---|---|---|
| 2014/0297266 A1* | 10/2014 | Nielson .................. | A61B 5/162 704/9 |
| 2015/0199744 A1* | 7/2015 | Tolvanen ........... | G06Q 30/0631 707/737 |
| 2017/0004184 A1* | 1/2017 | Jain ..................... | G06F 17/2735 |
| 2017/0032036 A1* | 2/2017 | McCain ............ | G06F 17/30864 |

* cited by examiner

*Primary Examiner* — Jonathan P Ouellette
(74) *Attorney, Agent, or Firm* — Sheppard Mullin Richter & Hampton LLP

(57) ABSTRACT

Systems, methods, and non-transitory computer readable media are configured to acquire a resume corpus. The resume corpus is processed to generate resume tokens. A machine learning model is trained based on the resume tokens. The machine learning model is applied to recommend a job classification based on evaluation data.

20 Claims, 7 Drawing Sheets

US 10,748,118 B2

SYSTEMS AND METHODS TO DEVELOP TRAINING SET OF DATA BASED ON RESUME CORPUS

FIELD OF THE INVENTION

The present technology relates to the field of machine learning. More particularly, the present technology relates to techniques for training a word vector model based on a resume corpus.

BACKGROUND

Recruiters can play a primary role in helping organizations locate job candidates. In some cases, a recruiter can proactively seek job candidates for the organization. In other cases, job candidates can initiate contact with an organization through a recruiter of the organization. The process to assess job candidates often can be initiated through electronic receipt by the organization of a resume of a job candidate. An organization can receive large volumes of resumes. The sheer number of resumes received by such an organization can create challenges for the recruiter in vetting the resumes to identify job candidates suited to the organization.

SUMMARY

Various embodiments of the present technology can include systems, methods, and non-transitory computer readable media configured to acquire a resume corpus. The resume corpus is processed to generate resume tokens. A machine learning model is trained based on the resume tokens. The machine learning model is applied to recommend a job classification based on evaluation data.

In an embodiment, the resume corpus is based on textual information from a plurality of resumes.

In an embodiment, the resume tokens include one or more unigrams and one or more bigrams.

In an embodiment, processing of the resume corpus comprises: removing stop words from the resume corpus.

In an embodiment, the stop words include at least one of pronouns, prepositions, articles, and conjunctions.

In an embodiment, processing of the resume corpus comprises: modifying capitalized letters of words in the resume corpus to have lowercase letters.

In an embodiment, processing of the resume corpus comprises: determining a value based on a number of instances in which a first word and a second word co-occur and a number of instances in which the first word and the second word occur individually.

In an embodiment, processing of the resume corpus comprises: generating a whitelist of bigrams constituting job titles parsed from the resume corpus.

In an embodiment, processing of the resume corpus further comprises: including a bigram in the whitelist based on satisfaction of a threshold appearance value relating to the bigram.

In an embodiment, the job classification includes a job title or a job pipeline.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
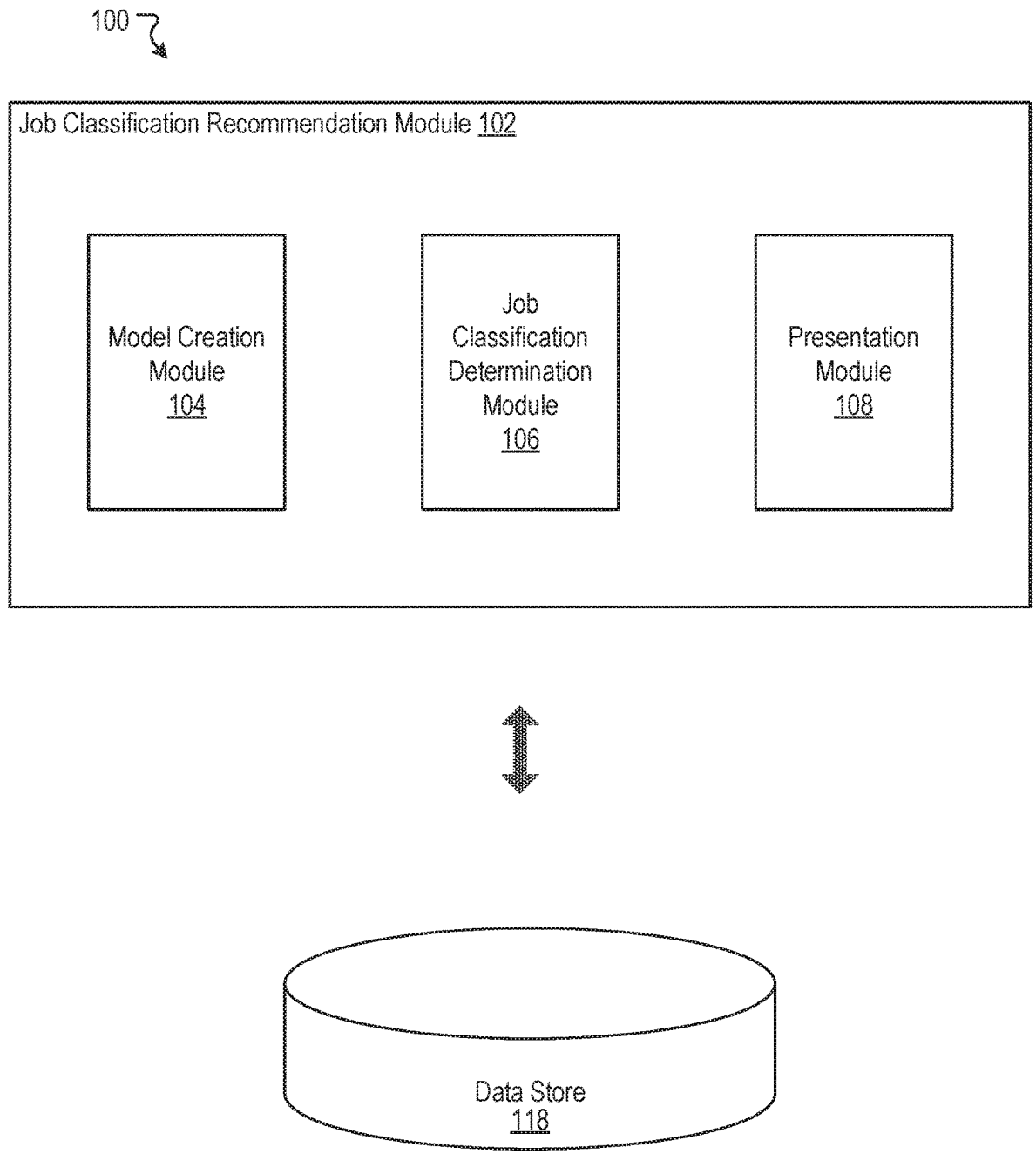
FIG. 1 illustrates a system including an example job classification recommendation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Creating Dictionary for Job Recommendation

As mentioned, recruiters can play a primary role in helping organizations locate job candidates. In some cases, a recruiter can proactively seek job candidates for the organization. In other cases, job candidates can initiate contact with an organization through a recruiter of the organization. The process to assess job candidates often can be initiated through electronic receipt by the organization of a resume of a job candidate. Certain organizations can receive large volumes of resumes. The sheer number of resumes received by such organizations can create challenges for recruiters in vetting the resumes to identify suitable job candidates.

Textual data can be used to train machine learning models for a variety of applications, including job candidate identification. Conventional training data can be, for example, raw text associated with Wikipedia or from other source of information. Many disadvantages are associated with the use of such conventional training data in the context of job candidate identification. For example, because conventional training data is general, it can introduce ambiguities based on words that may have one meaning with respect to job candidate identification and other meanings with respect to other endeavors. As another example, conventional training data may not be well structured in that closely related words may not appear in close proximity to one another. As yet another example, the conventional training data can include figurative language, sarcasm, emotional language, or the like that can mislead about the meaning of the data. As a result, the efficacy of a machine learning model developed from conventional training data can be impacted by these disadvantages.

An improved approach rooted in computer technology overcomes the foregoing and other disadvantages associated with conventional approaches specifically arising in the realm of computer technology. Systems, methods, and computer readable media of the present technology can acquire a resume corpus based on a large number of resumes. Stop words from the resume corpus can be removed from the resume corpus. Capitalized words in the resume corpus can be changed to lowercase words to facilitate deduplication of the resume corpus. Bigrams can be identified according to one or more techniques. In one example technique, bigrams can be identified based on a TF-IDF technique involving frequency of co-occurring words. In another example technique, a whitelist of bigrams can be curatively determined from job titles in resumes. Resume tokens including unigrams and the identified bigrams can constitute a training set of data to train a machine learning model. The machine learning model can be based on a technique that converts the resume tokens into vector representations in a vector space based on meaning of the tokens. One example machine learning model is word2vec. The machine learning model can be used for recommendations of job classification, such as job titles and job pipelines. For example, the machine learning model can be used to determine a suitable job title for a job candidate based on profile information of the candidate. As another example, the machine learning model can be used to determine a degree to which one or more resumes match search terms selected by a recruiter that relate to a job pipeline. More details regarding the present technology are described herein.

FIG. 1 illustrates an example system 100 including an example job classification recommendation module 102 configured to recommend job classifications for persons, such as recruiters, for an organization (e.g., a technology company), according to an embodiment of the present technology. Job classifications, as used herein, can refer to terms that span a spectrum between coarse descriptors to fine grained descriptors associated with or otherwise indicative of a job position, responsibility, role, category, or other scope of job. As used herein, "job title" may be used as a relatively coarse descriptor of a job classification and "job pipeline" may be used as a relatively fine grained descriptor of a job classification to illustrate the effectiveness of the job classification recommendation module 102 across a spectrum of both general and specific job classification types. In some embodiments, an express reference to a "job title" herein can also apply to a job pipeline and an express reference to a "job pipeline" herein can also apply to a job title. An organization can be any entity, such as a company, an establishment, a non-profit, a business, etc. The organization can be of any type or in any industry, such as aerospace and defense, agriculture, automotive, chemicals, construction, consumer goods and services, energy, financial services, firearms, food and beverage, health care, information and technology (e.g., software, hardware, etc.), real estate, manufacturing, mining and drilling, pharmaceuticals and biotechnology, publishing, telecommunications, transportation, etc. While a technology company or related job classifications may be exemplarily discussed in certain contexts for ease of explanation herein, an organization of any industry type or endeavor can be applicable to the present technology. For example, the present technology can be applied to any other type of organization by tailoring the training of a machine learning model with a training set of data that is relevant to the type of organization and its recruiting strategy. Further, the application of the machine learning model described in relation to the job classification recommendation module 102 can be applied to other purposes apart from job classification recommendations.

The job classification recommendation module 102 can include a model creation module 104, a job classification determination module 106, and a presentation module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the job classification recommendation module 102 can be implemented in any suitable combinations.

The model creation module 104 can acquire resumes (or CVs) and extract textual data from the resumes. The textual data can constitute a resume corpus. The resume corpus can be processed to generate a training set of data. For example, stop words can be identified and removed from the resume corpus. As another example, bigrams can be identified in the resume corpus. Other processing can be performed on the resume corpus. Resume tokens from the resume corpus can constitute unigrams and the identified bigrams. The resume tokens can constitute a training set of data to be provided to a machine learning model. The machine learning model can create vector representations of the resume tokens in a vector space. Use of the resume tokens instead of raw conventional data as the training set to train the machine learning model poses advantages in the use of the machine learning model for effective recommendation of job classifications. The model creation module 104 is discussed in more detail herein.

The job classification determination module 106 can apply the machine learning model developed by the training set of data to recommend job classifications. In some embodiments, the machine learning model can facilitate a recommendation of an appropriate job title based on evaluation data, such as profile data of a job candidate. In this regard, the profile information can be maintained by a social networking system. Based on the machine learning model, job titles of interest can be converted to vector representations constituting anchor points in the vector space. Various profile information types of the job candidate, such as job titles, educational majors, and educational degrees, can be processed by application of the profile information types to the model. The machine learning model, as discussed in more detail herein, can convert terms associated with profile information into vector representations in a vector space based on meaning of the terms. A vector representation for each term of a profile information type can be identified. For each vector representation of each term of a profile information type, a nearest anchor point can be identified subject to a threshold distance value condition. Based on a hierarchical rule, an anchor point can be chosen from the identified anchor points associated with terms of the profile information types. The chosen anchor point can represent a job title matched to the job candidate.

In some embodiments, the machine learning model can be applied to facilitate a determination as to a degree to which one or more resumes match evaluation data constituting search terms selected by a recruiter relating to a job pipeline. In this regard, the machine learning model, as discussed in more detail herein, can convert the search terms into vector representations in a vector space based on meaning of the terms. A set of search terms used by a plurality of recruiters can be represented in the vector space as a set of keywords (or anchor points). When a recruiter wishes to perform one or more searches on a set of resumes, each resume can be converted into an array of values representing a frequency of unique keywords by determining, for each identified chunk of terms in the resume, a nearest keyword. Each array of values representing a frequency of unique keywords can be normalized to reflect the relative importance of the keywords associated with array. Arrays of values representing a frequency of unique keywords for the set of resumes can be rows in a resume matrix. Search terms of the recruiter for each search to be performed can be expressed as an array of values representing a frequency of search terms associated with the search. Arrays of values representing a frequency of search terms associated with various searches can be columns in a search term matrix. A matrix multiplication can be performed for the resume matrix and the search term matrix to generate a score matrix. The resume scores reflected in the score matrix can determine one or more resumes most related to each search as well as one or more searches to which each resume is most related.

The presentation module 108, through a suitable user interface, can allow an entity, such a recruiter, to use the job classification recommendation module 102 to identify suitable job candidates. For example, the presentation module 108, through the user interface, can present matches between job candidates and suitable job titles, subject to applicable privacy settings. In some embodiments, the presentation module 108 can provide, via the user interface, the presentation to users who are employees of an organization to whom the job candidates are connected in a social network supported by a social networking system. The users can include recruiters of or for the organization. The presentation module 108 also can provide options for users to refer the job candidates to the organization.

As another example, the presentation module 108, through a suitable user interface, can prompt a user to provide one or more search terms for each search relating to a job pipeline to be performed against a set of resumes. In response to provision of the set of resumes and search terms, the presentation module 108, through the user interface, can present, for each search, a list of resumes relevant to the search. In addition, the presentation module 108, through the user interface, can present, for each resume, a list of searches that are most relevant to the resume. A list can be sorted based on applicable resume scores.

In some embodiments, the job classification recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the job classification recommendation module 102 can be, in part or in whole, implemented as software running on one or more computing devices or systems, such as on a server or a client computing device. For example, the job classification recommendation module 102 can be, in part or in whole, implemented within or configured to operate in conjunction or be integrated with a social networking system (or service), such as a social networking system 630 of FIG. 6. As another example, the job classification recommendation module 102 can be implemented as or within a dedicated application (e.g., app), a program, or an applet running on a user computing device or client computing system. In some instances, the job classification recommendation module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the job classification recommendation module 102. The data can include data relating to, for example, a resume corpus, stop words, bigrams from the resume corpus, unigrams from the resume corpus, resume tokens, a machine learning model to create vector representations of resume tokens, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the job classification recommendation module 102 can be configured to communicate and/or operate with the data store 118.

Figure 2:
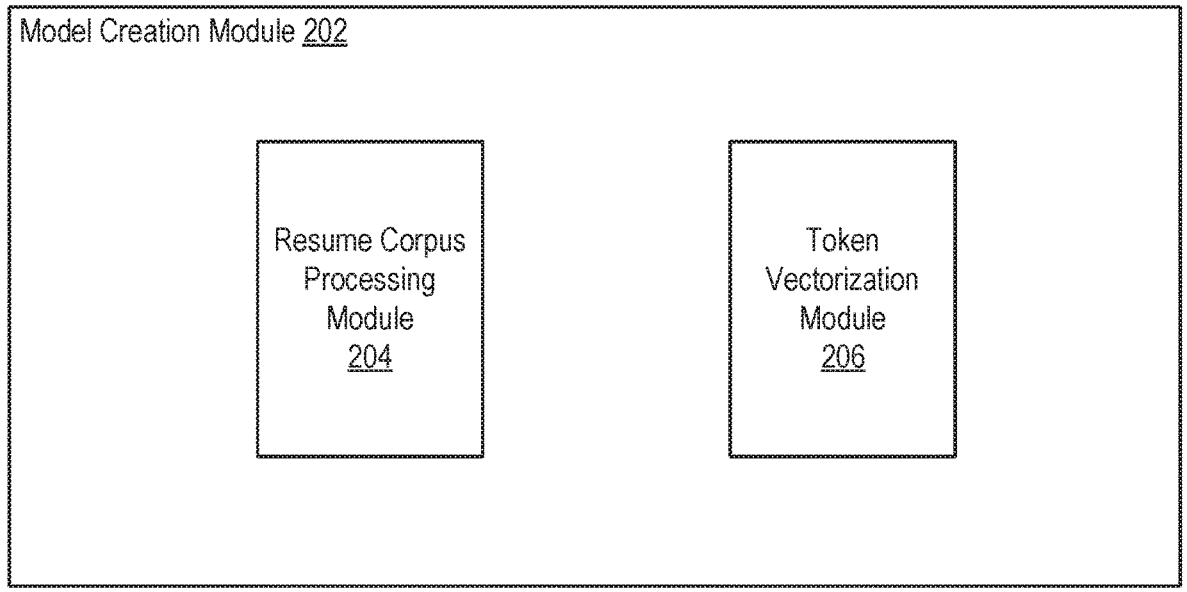
FIG. 2 illustrates an example model creation module, according to an embodiment of the present technology.

FIG. 2 illustrates an example model creation module 202, according to an embodiment of the present technology. In some embodiments, the model creation module 104 of FIG. 1 can be implemented with the model creation module 202. The model creation module 202 can include a resume corpus processing module 204 and a token vectorization module 206.

The resume corpus processing module 204 can determine a resume corpus constituting textual data from a plurality of resumes. The resume corpus processing module 204 can remove certain terms from the resume corpus. In some embodiments, the removed terms can include stop words. The resume corpus processing module 204 also can identify bigrams from the resume corpus. The resume corpus processing module 204 can perform other processing on the resume corpus. Resume tokens including unigrams and the identified bigrams from the resume corpus can constitute a training set of data to train a machine learning model. The resume corpus processing module 204 is described in more detail herein.

The token vectorization module 206 can generate a machine learning model to create a vector space of vector representations of the resume tokens of the training set. The machine learning model generated by the token vectorization module 206 can be trained using any suitable technique (or algorithm) that can create a vector space of vector representations of resume tokens (e.g., unigrams and bigrams) from resumes based on semantic meaning of the terms. In this regard, for terms that are relatively close in meaning, the machine learning model can create vector representations of the resume tokens that are relatively close to one another in the vector space. Likewise, for terms that are relatively far in meaning, the machine learning model can create vector representations of the resume tokens that are relatively far from one another in the vector space. Resume tokens with similar or identical meanings are clustered together. The vector space can represent a dictionary of terms. As just one illustration, the resume corpus can be based on approximately one million resumes and the vector space can represent a dictionary of approximately eight million terms taken from the resumes, depending on the content of the resumes. In some embodiments, the technique to create a vector space of vector representations of terms can be based at least in part on a word2vec technique.

Figure 3:
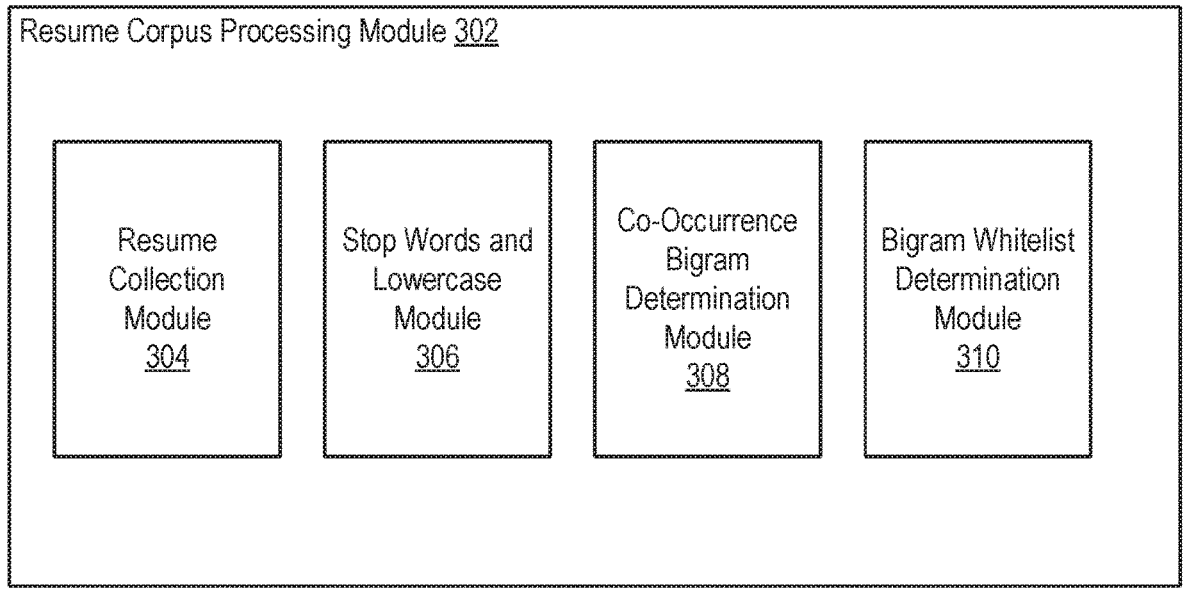
FIG. 3 illustrates an example resume corpus processing module, according to an embodiment of the present technology.

FIG. 3 illustrates an example resume corpus processing module 302, according to an embodiment of the present technology. The resume corpus processing module 302 can acquire and process resume data to train a machine learning model that can determine job classification recommendations. The use of resume data to train a machine learning model to determine job classification recommendations can pose many advantages over conventional use of other generalized, raw (or unprocessed) training data. Because the processed resume data pertain specifically to job classification determinations, the machine learning model can avoid ambiguities based on words that may have one meaning with respect to job classification determinations yet other meanings with respect to other endeavors. For example, the appearance of the word "bug" could have one meaning in the context of a resume relating to a certain job classification (e.g., software engineering) and could have other, different meanings in other generalized contexts. Further, the processed resume data is well structured in that closely related words are likely to appear in close proximity to one another, further enhancing training of the machine learning model. For example, resume data is often characterized by a stated job classification immediately followed an explanation of or elaboration about the job classification. Such structured data is well suited to the development of an accurate machine learning model. Further still, the processed resume data likely does not contain figurative language, sarcasm, emotional language, or the like that can mislead about the meaning of the data. In this regard, the omission of such misleading language can enhance the accuracy of the machine learning model for job classification determinations.

In some embodiments, the resume corpus processing module 204 of FIG. 2 can be implemented with the resume corpus processing module 302. The resume corpus processing module 302 can include a resume collection module 304, a stop words and lowercase module 306, a co-occurrence bigram determination module 308, and a bigram whitelist determination module 310.

The resume collection module 304 can acquire a number of resumes to generate a training set of data to train a machine learning model. The number of resumes can be any suitable number of resumes, such as, for example, one million resumes. In some embodiments, a larger number of resumes or a smaller number of resumes can be used. In some instances, the resumes can include resumes received by an organization. For example, the resumes can include resumes of employees of the organization.

The stop words and lowercase module 306 can identify stop words in the resume corpus and remove the stop words from the resume corpus. In general, stop words can refer to common words or semantically insignificant words that may be excluded from natural language processing techniques. In various embodiments, the stop words and lowercase module 306 can identify and remove one or more stop words or type of stop words in the resume corpus. Types of stop words can include, for example, pronouns, prepositions, articles, conjunctions, and the like. In addition, the stop words and lowercase module 306 can modify some or all words in the resume corpus so that capitalized letters of the words are changed to lowercase letters. In some embodiments, deduplication of words in the resume corpus is performed. The use of lowercase letters instead of capitalized letters in words can facilitate such deduplication.

The co-occurrence bigram determination module 308 can determine bigrams from the resume corpus. In some embodiments, the bigrams can be determined using a TF-IDF technique based on word co-occurrence. In some embodiments, determination of a bigram can be based on satisfaction of a threshold. The threshold can relate to whether a first word (e.g., "software") and a second word (e.g., "engineer"), which together constitute a potential bigram (e.g., "software engineer"), co-occur (i.e., occur consecutively) at a sufficiently high frequency value in the resume corpus (or another corpus of data) in relation to whether the first word and the second word do not co-occur (i.e., occur non-consecutively) at a sufficiently low frequency value in the resume corpus.

In some embodiments, the determination of a bigram based on a first word and a second word that co-occur can be based on a ratio of a number of instances in which the first word and the second word co-occur divided by a product of a number of instances in which the first word occurs individually and a number of instances in which the second word occurs individually. The ratio can be compared to a threshold value to determine the existence of a bigram. If the ratio based on the first word and the second word does not satisfy the threshold value, the first word and the second word are not deemed to constitute a bigram. Similarly, if the ratio based on the first word and the second word does satisfy the threshold value, the first word and the second word are deemed to constitute a bigram. The threshold value is configurable. In some embodiments, a higher threshold value can be selected when a higher confidence level regarding the existence of a bigram is required. In some embodiments, a lower threshold value can be selected when a lower confidence level regarding the existence of a bigram is acceptable.

The bigram whitelist determination module 310 can determine bigrams from a whitelist reflecting job titles taken from the resumes. The bigram whitelist determination module 310 can identify bigrams that have not been identified by the co-occurrence bigram determination module 308. For example, based on certain threshold values, the co-occurrence bigram determination module 308 might fail to identify "software developer" as a bigram. Accordingly, the bigram whitelist determination module 310 can parse the resumes to determine job titles from the resumes or can receive job titles from resumes parsed by a third party system. The job titles from the resumes can be identified as such based on the typical structure and organization of the conventional format of standard resumes. The parsing can be done automatically or manually. Bigrams associated with the job titles can be identified in this manner for potential inclusion in a whitelist of bigrams.

In some cases, the parsing of a resume can result in the identification of a job title having three or more words. In such cases, the bigram whitelist determination module 310 can associate pairs of consecutive words as potential bigrams. For example, for a job title having three words (e.g., "senior software developer") that has been parsed from a resume, the bigram whitelist determination module 310 can associate the first word and the second word as a bigram (i.e., "senior software") for potential inclusion in the whitelist. Likewise, the bigram whitelist determination module 310 can associate the second word and the third word as another bigram (i.e., "software developer") for potential inclusion in the whitelist. In some embodiments, a number of appearances in the resume corpus of a bigram for potential inclusion in the whitelist must satisfy a threshold appearance value before the bigram can be included in the whitelist. When the number of appearances of the bigram does not satisfy the threshold appearance value, the bigram can be excluded from the whitelist. For instance, the threshold appearance value can be, for example, 20 or some other suitable value.

In some embodiments, the resume corpus processing module 302 can perform other types of processing to optimize unigrams and bigrams as resume tokens as a training set of data. In some instances, additional techniques to determine bigrams can be implemented in view of the semantic importance and specificity of bigrams, which can facilitate more optimal training of a machine learning model. In some instances, certain unigrams or bigrams can be eliminated from further consideration to account for anomalies or mistakes in the resume corpus or to enhance the quality of the data provided for training. The unigrams and the bigrams resulting from the processing performed by the resume corpus processing module 302 are resume tokens that constitute a training set of data to be provided to the token vectorization module 206 to train a machine learning model.

Figure 4:
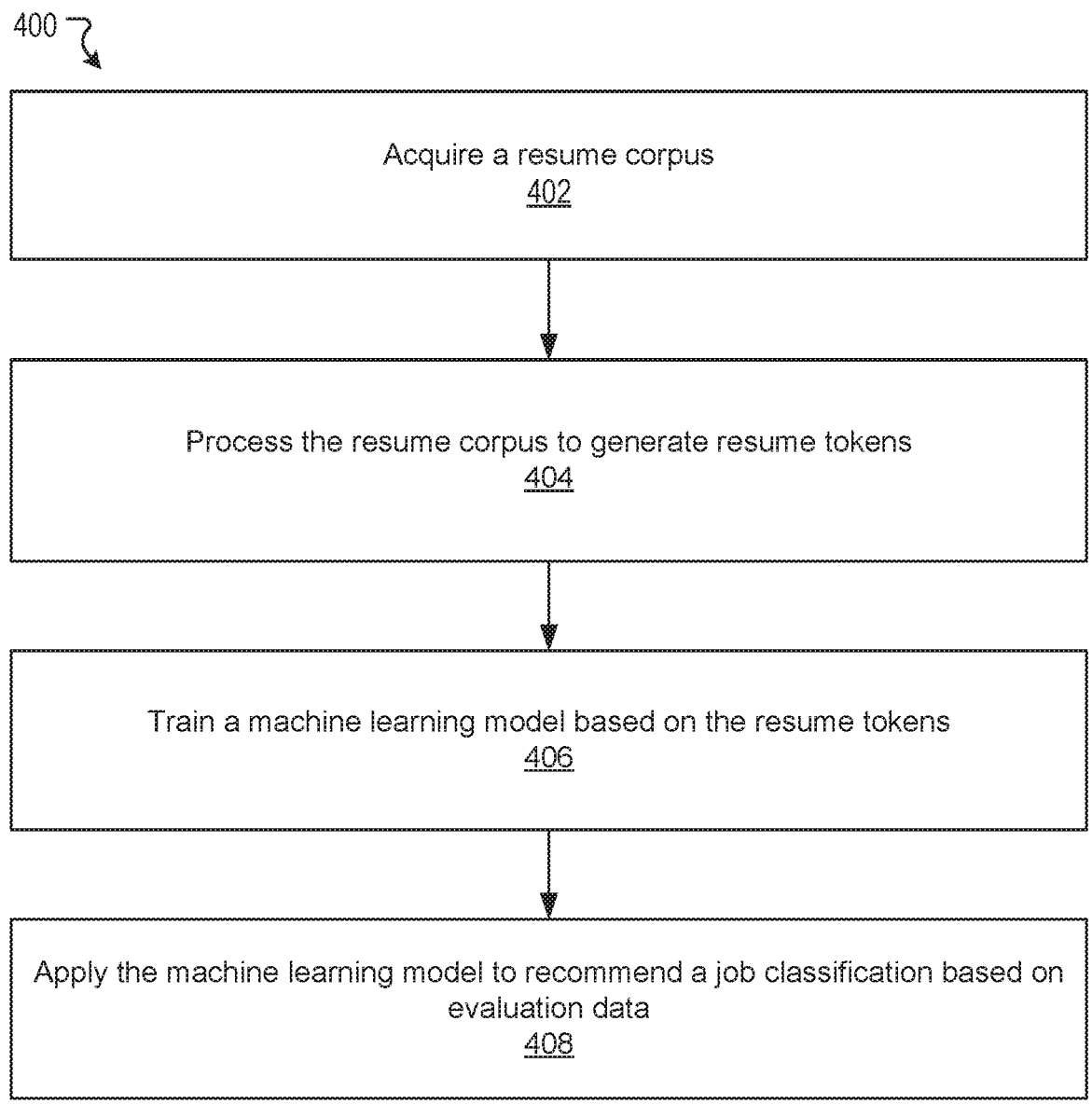
FIG. 4 illustrates an example method to generate a training set of data to train a machine learning model to recommend job classifications, according to an embodiment of the present technology.

FIG. 4 illustrates a first example method 400 to generate a training set of data to train a machine learning model to recommend job classifications, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can acquire a resume corpus. At block 404, the method 400 can process the resume corpus to generate resume tokens. At block 406, the method 400 can train a machine learning model based on the resume tokens. At block 408, the method 400 can apply the machine learning model to recommend a job classification based on evaluation data. Other suitable techniques that incorporate various features and embodiments of the present technology are possible.

Figure 5:
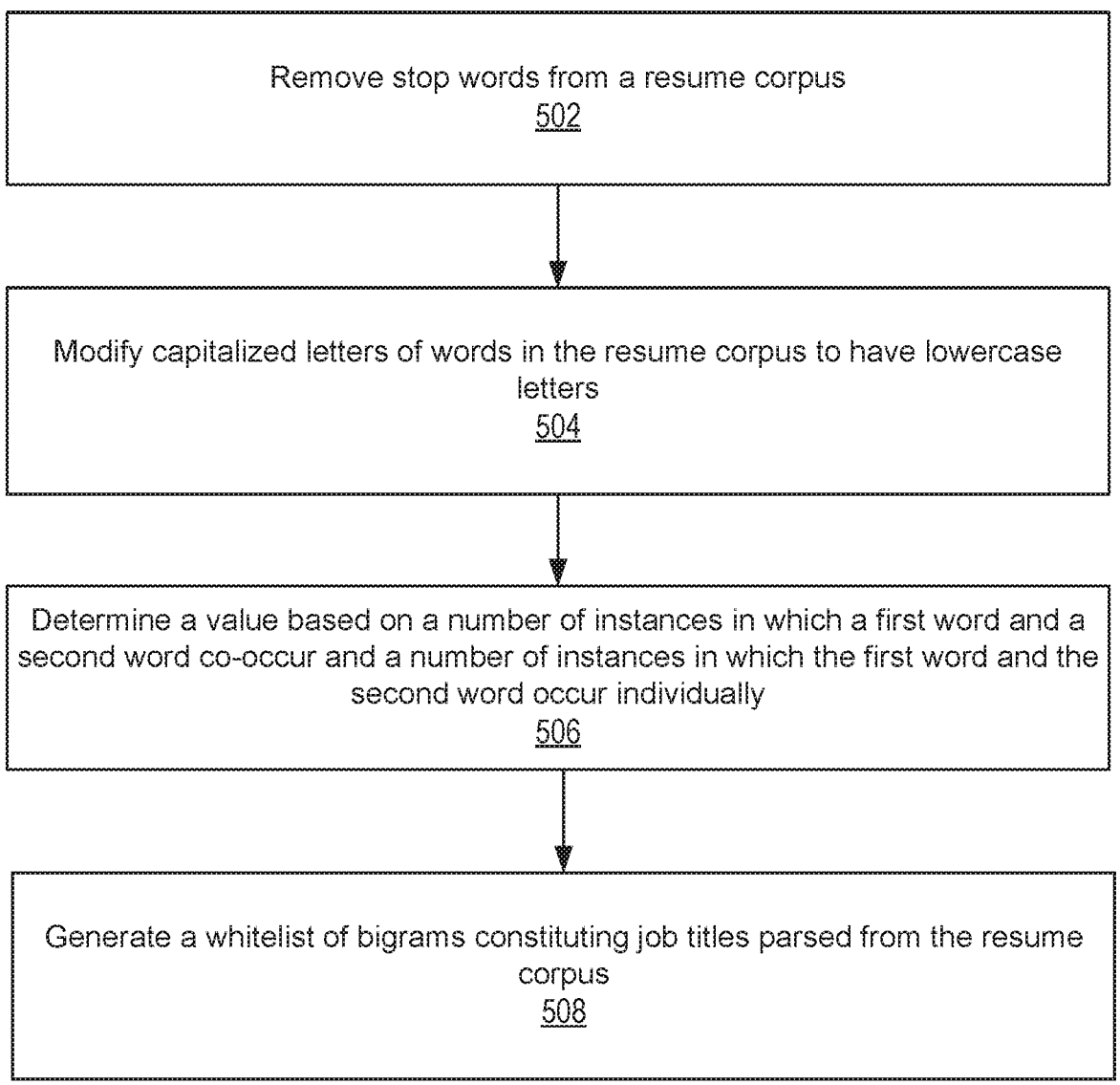
FIG. 5 illustrates an example method to process a resume corpus to generate resume tokens to train a machine learning model, according to an embodiment of the present technology.

FIG. 5 illustrates an example method 500 to process a resume corpus to generate resume tokens to train a machine learning model, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can remove stop words from a resume corpus. At block 504, the method 500 can modify capitalized letters of words in the resume corpus to have lowercase letters. At block 506, the method 500 can determine a value based on a number of instances in which a first word and a second word co-occur and a number of instances in which the first word and the second word occur individually. At block 508, the method 500 can generate a whitelist of bigrams constituting job titles parsed from the resume corpus. Other suitable techniques that incorporate various features and embodiments of the present technology are possible.

Social Networking System—Example Implementation

Figure 6:
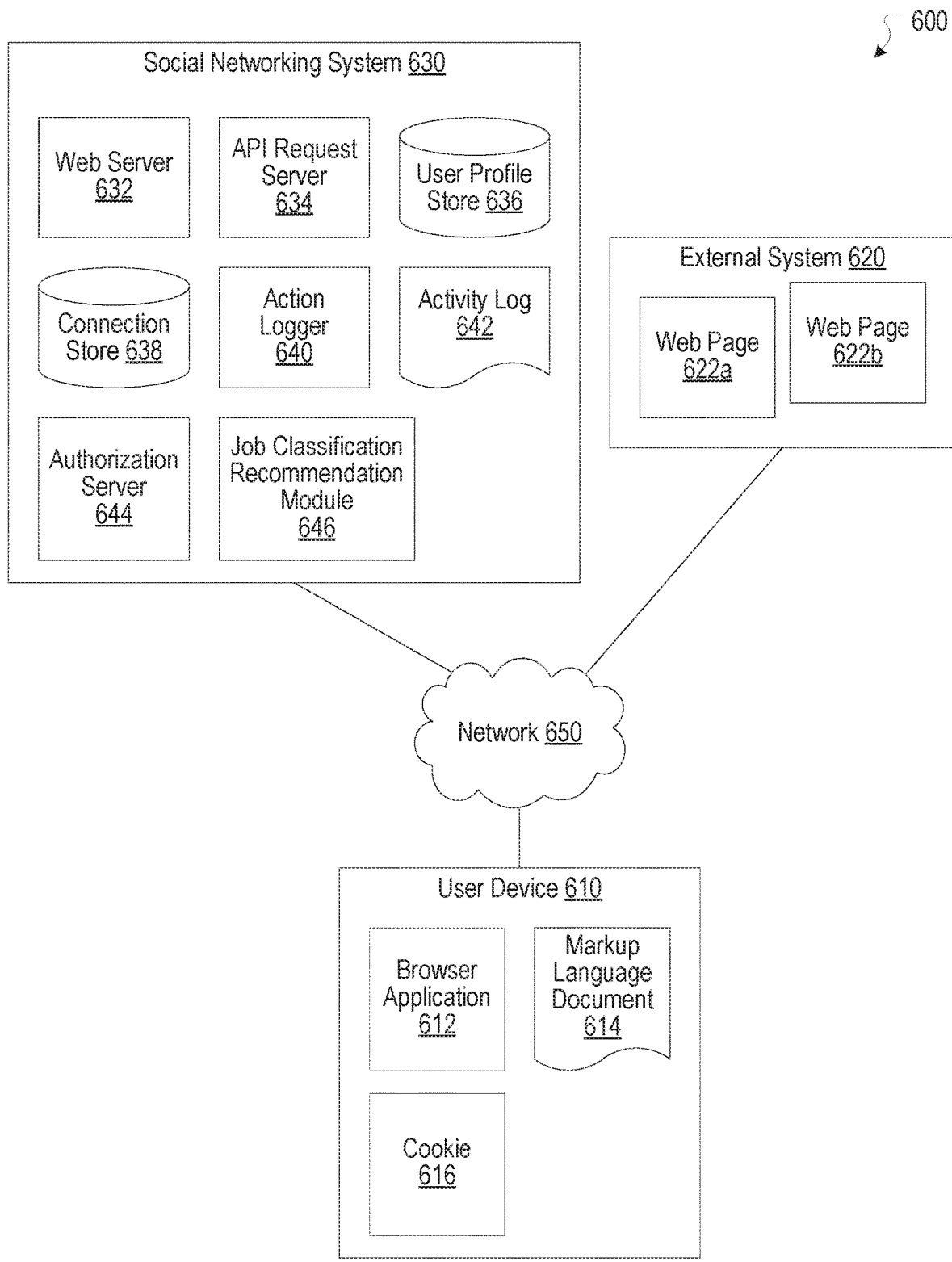
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a job classification recommendation module 646. The job classification recommendation module 646 can be implemented with the job classification recommendation module 102, as discussed in more detail herein. In some embodiments, one or more functionalities of the job classification recommendation module 646 can be implemented in the user device 610.

Hardware Implementation

Figure 7:
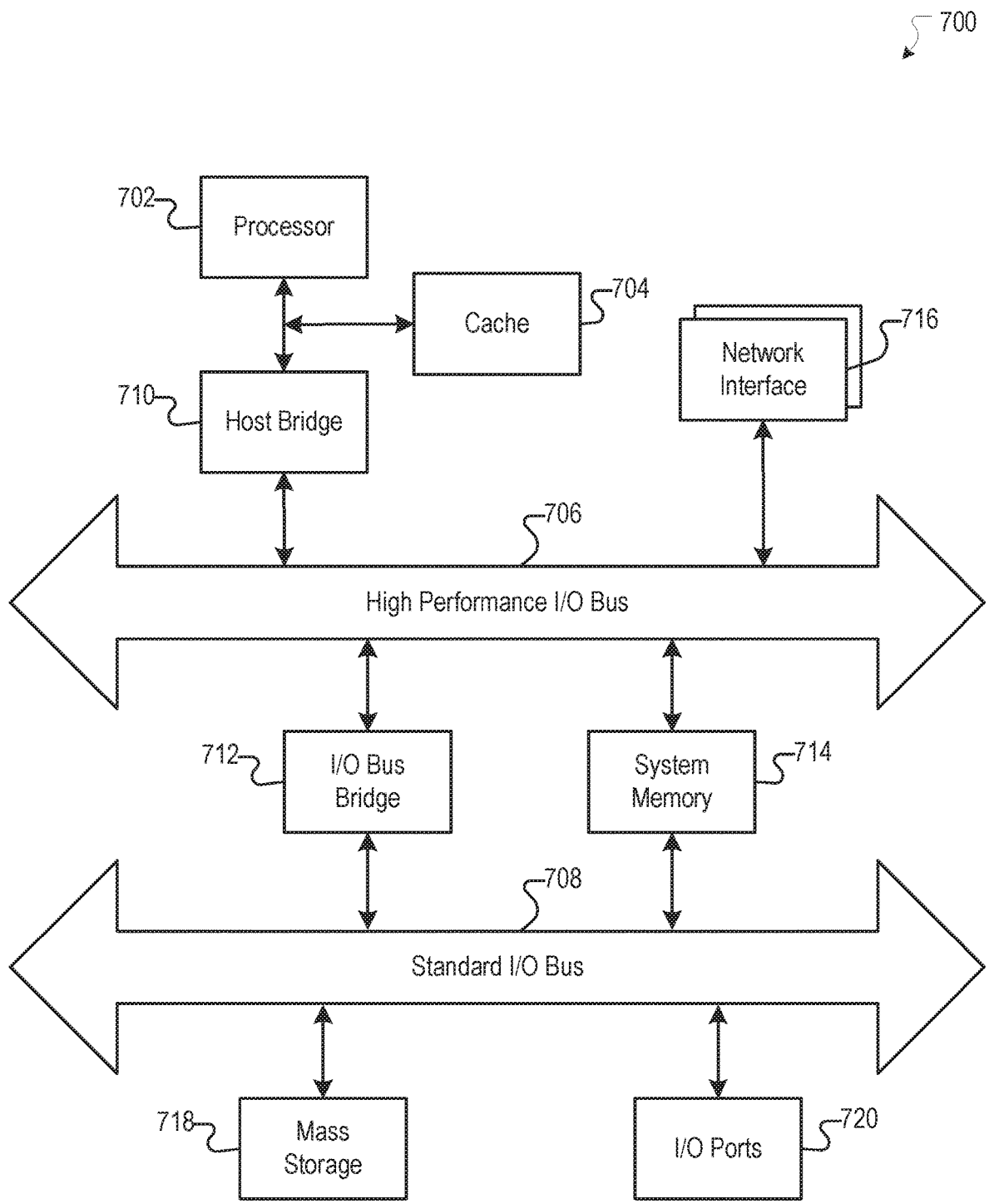
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a resume corpus;
   processing, by the computing system, the resume corpus to generate resume tokens from the resume corpus, wherein the processing comprises:
   determining a ratio based on co-occurrence of a first word and a second word of the resume corpus versus individual occurrence of the first word and the second word; and
   determining, based on the ratio, the existence of a bigram including the first word and the second word to be used as training data;
   training, by the computing system, a machine learning model to recommend a job classification based at least in part on the bigram; and
   applying, by the computing system, the machine learning model to recommend a job classification based on evaluation data.

2. The computer-implemented method of claim 1, wherein the resume corpus is based on textual data from a plurality of resumes.

3. The computer-implemented method of claim 1, wherein the resume tokens include one or more unigrams and one or more bigrams.

4. The computer-implemented method of claim 1, wherein the processing the resume corpus comprises:
   removing stop words from the resume corpus.

5. The computer-implemented method of claim 4, wherein the stop words include at least one of pronouns, prepositions, articles, and conjunctions.

6. The computer-implemented method of claim 1, wherein the processing the resume corpus comprises:
   modifying capitalized letters of words in the resume corpus to have lowercase letters.

7. The computer-implemented method of claim 1, wherein the processing the resume corpus comprises:
   generating a whitelist of bigrams constituting job titles parsed from the resume corpus,
   wherein the training a machine learning model to recommend a job classification is further based at least in part on the whitelist of bigrams constituting job titles.

8. The computer-implemented method of claim 7, wherein the processing the resume corpus further comprises:
   including a bigram in the whitelist based on satisfaction of a threshold appearance value relating to the bigram.

9. The computer-implemented method of claim 1, wherein the job classification includes a job title or a job pipeline.

10. The computer-implemented method of claim 1, wherein the processing further comprises:
    comparing the ratio to a threshold value; and
    determining the existence of a bigram including the first word and the second word to be used as training data when the ratio satisfies the threshold value.

11. A system comprising:
    at least one processor; and
    a memory storing instructions that, when executed by the at least one processor, cause the system to perform:
    acquiring a resume corpus;
    processing the resume corpus to generate resume tokens from the resume corpus, wherein the processing comprises:
    determining a ratio based on co-occurrence of a first word and a second word of the resume corpus versus individual occurrence of the first word and the second word; and
    determining, based on the ratio, the existence of a bigram including the first word and the second word to be used as training data;
    training a machine learning model to recommend a job classification based at least in part on the bigram; and
    applying the machine learning model to recommend a job classification based on evaluation data.

12. The system of claim 11, wherein the resume corpus is based on textual data from a plurality of resumes.

13. The system of claim 11, wherein the resume tokens include one or more unigrams and one or more bigrams.

14. The system of claim 11, wherein the processing the resume corpus comprises:

removing stop words from the resume corpus.

15. The system of claim 14, wherein the stop words include at least one of pronouns, prepositions, articles, and conjunctions.

16. A non-transitory computer-readable storage medium including instructions that, when executed by at least one processor of a computing system, cause the computing system to perform a method comprising:

acquiring a resume corpus;

processing the resume corpus to generate resume tokens from the resume corpus, wherein the processing comprises:

determining a ratio based on co-occurrence of a first word and a second word of the resume corpus versus individual occurrence of the first word and the second word; and determining, based on the ratio, the existence of a bigram including the first word and the second word to be used as training data;

training a machine learning model to recommend a job classification based at least in part on the bigram; and applying the machine learning model to recommend a job classification based on evaluation data.

17. The non-transitory computer-readable storage medium of claim 16, wherein the resume corpus is based on textual data from a plurality of resumes.

18. The non-transitory computer-readable storage medium of claim 16, wherein the resume tokens include one or more unigrams and one or more bigrams.

19. The non-transitory computer-readable storage medium of claim 16, wherein the processing the resume corpus comprises:

removing stop words from the resume corpus.

20. The non-transitory computer-readable storage medium of claim 19, wherein the stop words include at least one of pronouns, prepositions, articles, and conjunctions.

* * * * *